(12) United States Patent
Lederer

(10) Patent No.: US 10,895,345 B2
(45) Date of Patent: Jan. 19, 2021

(54) MOBILE DEVICE ACCESSORY

(71) Applicant: Broder Bros., Co., Trevose, PA (US)

(72) Inventor: Jeffrey Lederer, Greenwich, CT (US)

(73) Assignee: Broder Bros., Co., Trevose, PA (US)

( * ) Notice: Subject to any disclaimer, the term of this patent is extended or adjusted under 35 U.S.C. 154(b) by 0 days.

(21) Appl. No.: 16/174,569

(22) Filed: Oct. 30, 2018

(65) Prior Publication Data

US 2020/0063915 A1 Feb. 27, 2020

Related U.S. Application Data

(63) Continuation-in-part of application No. 29/660,456, filed on Aug. 21, 2018, now Pat. No. Des. 870,736.

(51) Int. Cl.
| | | |
|---|---|---|
| *A47G 29/00* | (2006.01) | |
| *F16M 13/04* | (2006.01) | |
| *F16M 11/38* | (2006.01) | |
| *F16M 11/20* | (2006.01) | |

(52) U.S. Cl.
CPC ........ *F16M 13/04* (2013.01); *F16M 11/2007* (2013.01); *F16M 11/38* (2013.01)

(58) Field of Classification Search
CPC . F16M 11/10; A45F 5/00; A45F 5/021; G06F 1/16
See application file for complete search history.

(56) References Cited

U.S. PATENT DOCUMENTS

| | | | | |
|---|---|---|---|---|
| 8,560,031 | B2* | 10/2013 | Barnett | F16M 11/10 455/575.8 |
| 8,737,066 | B1* | 5/2014 | Block | A45F 5/00 224/217 |
| 9,300,346 | B2* | 3/2016 | Hirsch | H04B 1/385 |
| 2012/0042476 | A1* | 2/2012 | Karmatz | B25G 1/102 16/421 |
| 2015/0115112 | A1* | 4/2015 | Noh | A45F 5/021 248/126 |
| 2016/0066452 | A1* | 3/2016 | Music | B65D 43/163 206/742 |

OTHER PUBLICATIONS

FLYGRIP, "The Way Your Smartphone Should Feel," downloaded from the internet <https://shop.flygrip.com/?ref=pg-home>, published on Jul. 1, 2017.

* cited by examiner

*Primary Examiner* — Amy J. Sterling
(74) *Attorney, Agent, or Firm* — Myers Wolin, LLC

(57) ABSTRACT

An accessory for holding or supporting a portable device or portable device case is provided. The accessory has an engagement element for engaging a surface of the portable device, a base element movable relative to the engagement element, and a support structure linking the engagement element and the base element. The accessory has a first configuration in which the engagement element is adjacent the base element and wherein a thickness of the accessory corresponds to a thickness of the engagement element combined with the thickness of the base element, and a second configuration in which the engagement element is spaced apart from the base element by the support structure.

12 Claims, 7 Drawing Sheets

MOBILE DEVICE ACCESSORY

CROSS REFERENCE TO RELATED APPLICATION

This present application is a Continuation in Part from Design Patent Application 29/660,456, filed Aug. 21, 2018, the entire contents of which are incorporated herein by reference.

FIELD OF THE INVENTION

The invention is an accessory functioning as a stand or gripping device for a mobile device.

BACKGROUND

Large smartphones and other mobile devices are often viewed without a user holding them. Accordingly, there is a need for an accessory that can function as a stand for a mobile device while being portable and discreetly out of the way while not in use.

Further, as the smart phone and computer industry continues to provide phones and mobile devices with larger screens, resulting in larger smartphones and other portable devices, users have increasing difficulty using those larger smartphones with one hand. There is a need for a smartphone accessory that would enable a user to hold on to a phone with one hand and enable full use and mobility of the thumb to operate the phone, since the thumb is often the primary finger used to navigate smartphones functions and features.

There is a further need that such an accessory, whether providing a stand, a grip, or both, be adaptable to any mobile device regardless of whether such a mobile device is in a case.

SUMMARY

An accessory is provided for a portable device or portable device case comprising an engagement element for engaging a surface of a portable device, a base element movable relative to the engagement element, and a support structure linking the engagement element and the base element.

The accessory has a first configuration in which the engagement element is adjacent the base element and wherein a thickness of the accessory corresponds to a thickness of the engagement element combined with the thickness of the base element, and a second configuration in which the engagement element is spaced apart from the base element by the support structure.

Each of the engagement element and the base element typically has at least one substantially planar surface, wherein those planar surfaces face away from each other when in the first configuration.

In some embodiments, the engagement element is a linear element hinged relative to each of the engagement element and the base element. One of the base element or the engagement element has a pocket for storing the support structure when in the first configuration, such that it does not add thickness.

In some embodiments, the hinges may have hinges with checks for fixing the hinges in position when extended. Multiple checks may be provided to provide a variety of positions. The linear element may be hinged to the engagement and base elements at an eccentric location.

The engagement element may fix the accessory to the portable device, and/or the base element may fix the accessory to a support surface.

DETAILED DESCRIPTION OF THE PREFERRED EMBODIMENTS

Figure 1:
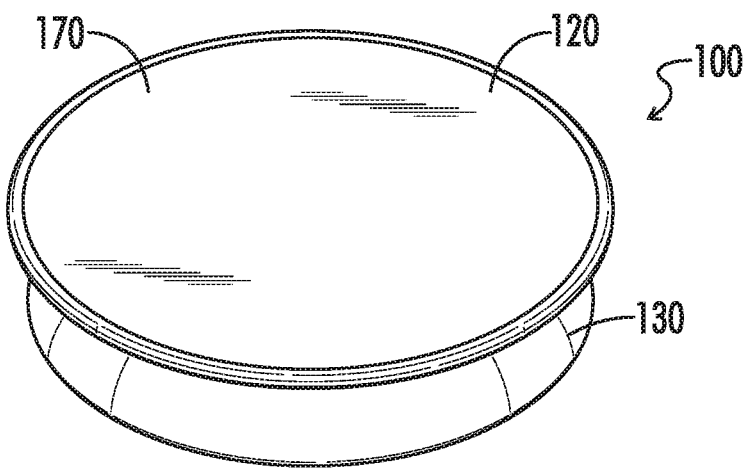
FIG. 1 is a top perspective view of an accessory for a portable device in a first configuration.
Figure 2:
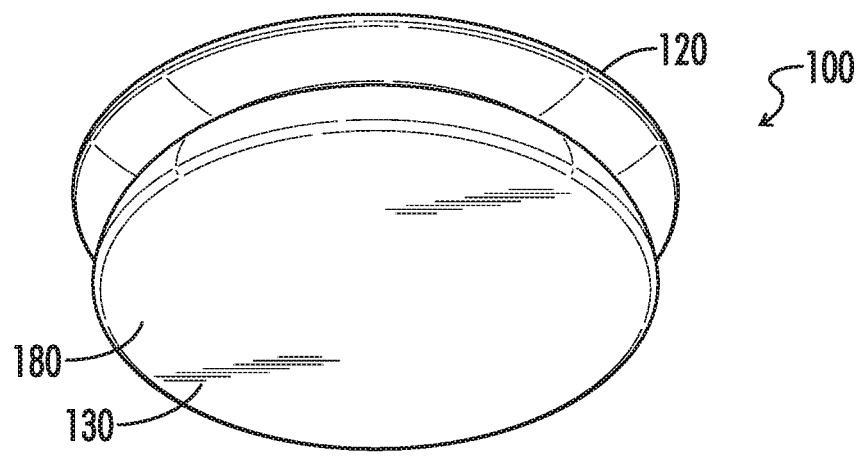
FIG. 2 is a bottom perspective view of the accessory of FIG. 1 in the first configuration.
Figure 3:
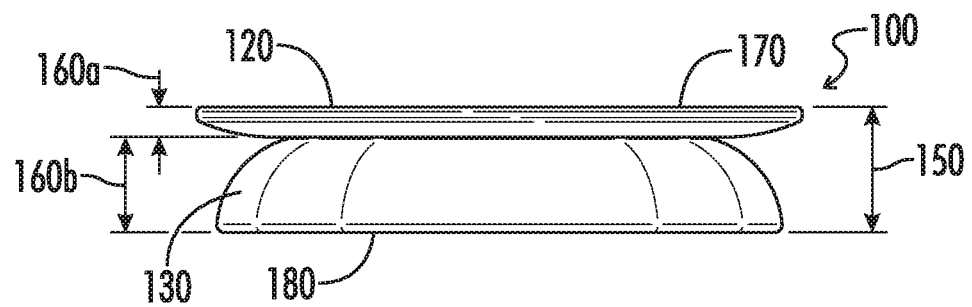
FIG. 3 is a side profile view of the accessory of FIG. 1 in the first configuration.
Figure 4:
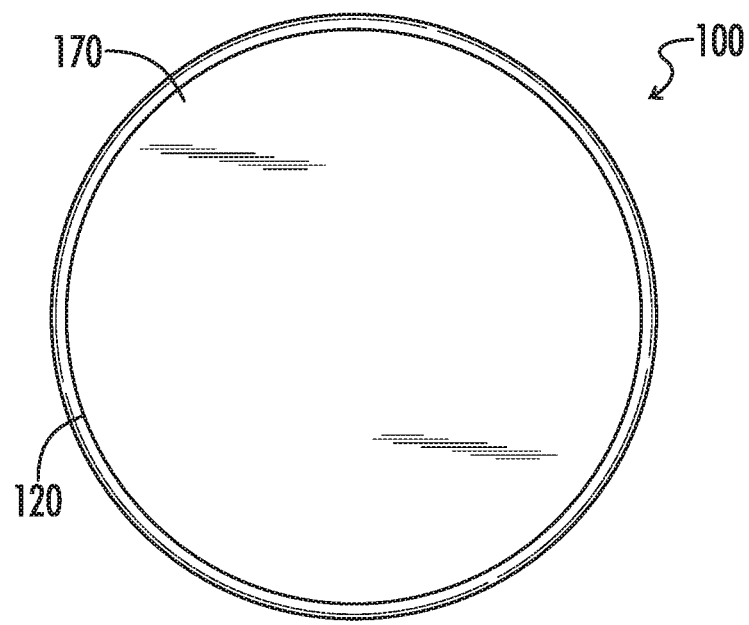
FIG. 4 is a top view of the accessory of FIG. 1 in the first configuration.
Figure 5:
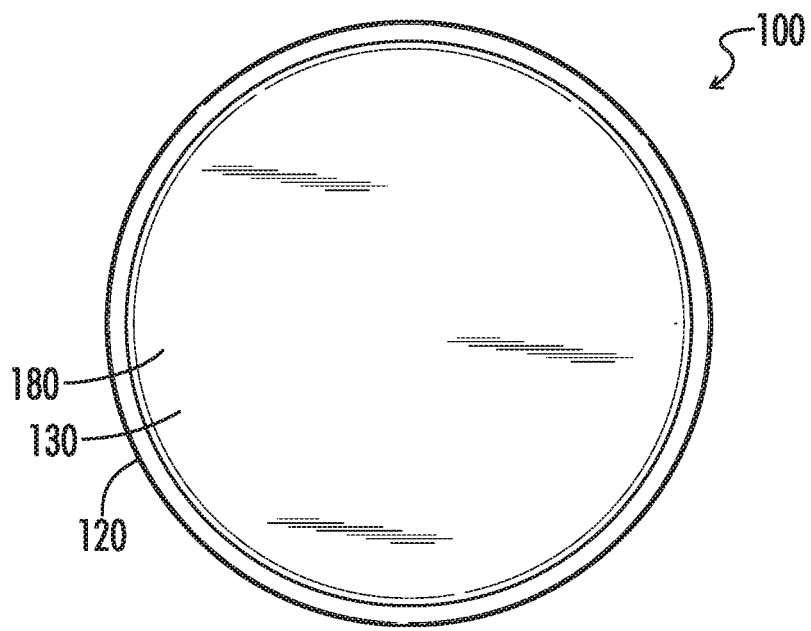
FIG. 5 is a bottom view of the accessory of FIG. 1 in the first configuration.
Figure 6:
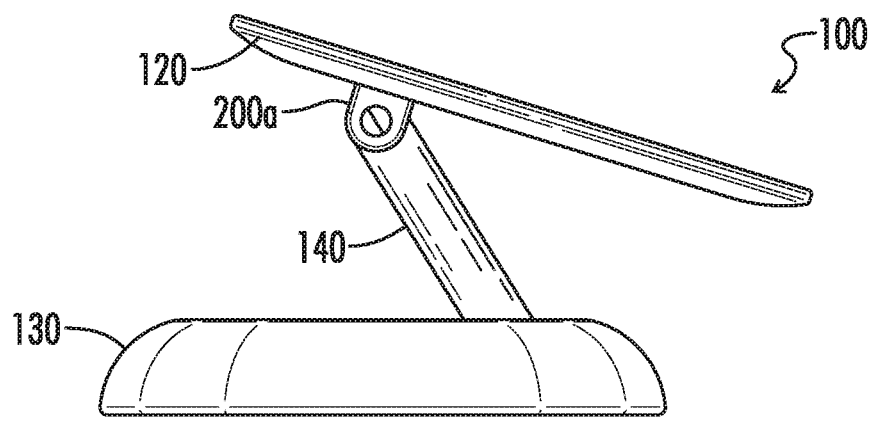
FIG. 6 is side profile view of the accessory of FIG. 1 in a second configuration.
Figure 7:
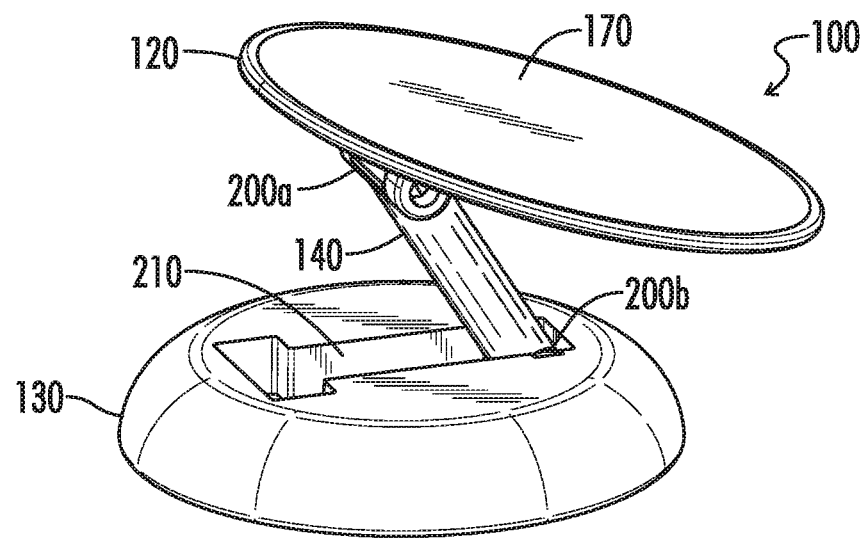
FIG. 7 is a top perspective view of the accessory of FIG. 1 in the second configuration.
Figure 8:
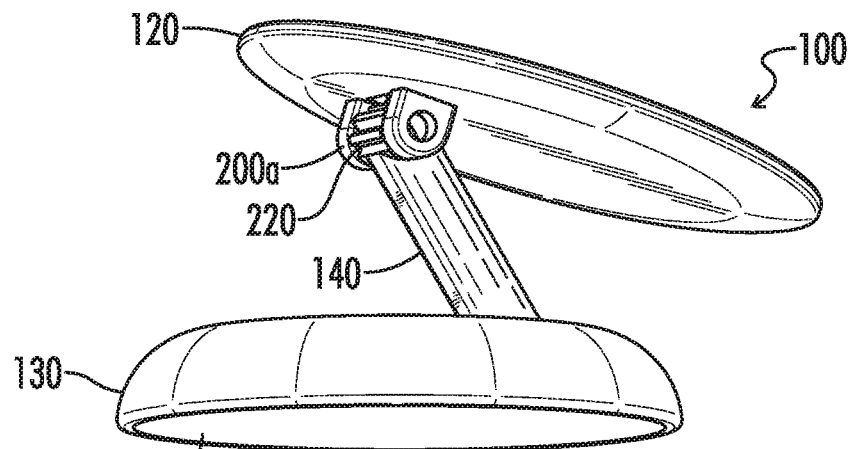
FIG. 8 is a bottom perspective view of the accessory of FIG. 1 in the second configuration.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIGS. 1-8 show an accessory 100 for a portable device 110, such as a smartphone. The accessory 100 is shown in a first configuration in FIGS. 1-5, and in a second configuration in FIGS. 6-8. The accessory 100 enables a user of a smartphone 110 or other portable device to rest the device on an integrated stand or to operate even the largest device one-handed while minimizing its size when stored. To allow for this, the accessory 100 is designed to be stable in at least two configurations, the flattened configuration shown in FIGS. 1-5 for when the device 110 is stored, and the extended configuration shown in FIGS. 6-8 for when it is deployed.

The accessory 100 comprises an engagement element 120 for engaging a surface of the portable device 110. While the discussion herein relates to an engagement element 120 for engaging a portable device 110 directly, it will be understood that such engagement may be by way of a phone case. The accessory further comprises a base element 130 that is movable relative to the engagement element 120 and a support structure 140, visible only when the accessory is in the second configuration, that links the engagement element and the base element.

In the first configuration, the engagement element 120 is adjacent the base element 130 and the overall thickness of the accessory 150 is substantially equal to the combined thicknesses of the engagement element 160a and the base element 160b. In the second configuration, the engagement element 120 is spaced apart from the base element 130 by the support structure 140.

As shown, the engagement element 120 and the base element 130 each typically have at least one substantially planar surface 170, 180, where the substantially planar surfaces face away from each other in the first configuration. The planar surface 170 of the engagement element 120 is for engaging with the mobile device 110 and may be provided with a permanent or semi-permanent fixation mechanism, such as tape, or glue, for bonding the engagement element to the mobile device. Alternatively, the planar surface 170 may be provided with a temporary fixation mechanism, such as a gripping surface or a suction cup in order to temporary apply the mobile device 110 to the accessory 100, such as when in use as a stand for the mobile device.

The planar surface 180 of the base element 130 is for engaging with a surface external to the device, such as on a table or wall. Accordingly, the planar surface 180 of the base element 130 may be similarly provided with a permanent, semi-permanent, or temporary fixation element for mounting the device at a specified location. In some embodiments, the base element 130 may be permanently fixed to surface and the planar surface 170 of the engagement element 120 may be a gripping surface, such that the accessory 100 is always available at a specific location as a stand.

The engagement element 120 and the base element 130 each may take the form of substantially planar circular disks, as shown. Alternatively, other configurations may be used. For example, the engagement element 120 may take the form of the back surface of a mobile device case, or either surface may take the form of some other design, such as a corporate logo.

As shown, the support structure 140 may be a linear element hinged relative to each of the engagement element 120 and the base element 130. Accordingly, the linear element may be fixed to each element with corresponding hinges 200a, b. The base element is provided with a pocket 210, typically taking the form of a channel, for storing the support structure 140 when folded. As shown, the pocket 210 may be sized to fit the support structure 140 along with the corresponding hinges 200a, b, such that when in the first configuration, the engagement element 120 can lay flat against the base element 130.

While the support structure 140 is shown as a linear element, it may take a wide variety of forms. Further, in some embodiments, the base element 130 and the engagement element 120 may be rotatable relative to each other in one or both of the first configuration and second configuration. Accordingly, a portion of the engagement element 120 and/or the base element may rotate relative to a fixation point of the support structure.

While shown and described in the base element 130, it will be understood that the pocket 210 may similarly be provided in the engagement element 120 or partially incorporated into both elements. As shown, the support structure 140 may be hinged at a point of each of the engagement element 120 and the base element 130 offset from a center point of the corresponding element. Accordingly, the support structure 140 is hinged to the surface eccentrically, allowing significant flexibility in the angles of the elements relative to each other.

Figure 9:
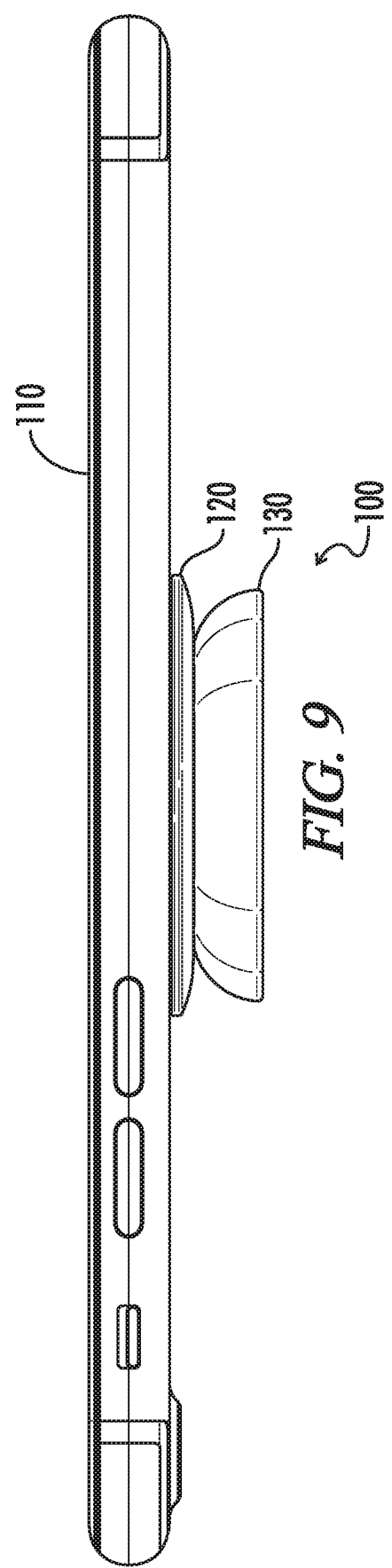
FIG. 9 is side profile view of the accessory of FIG. 1 in the first configuration and fixed to a phone.
Figure 10:
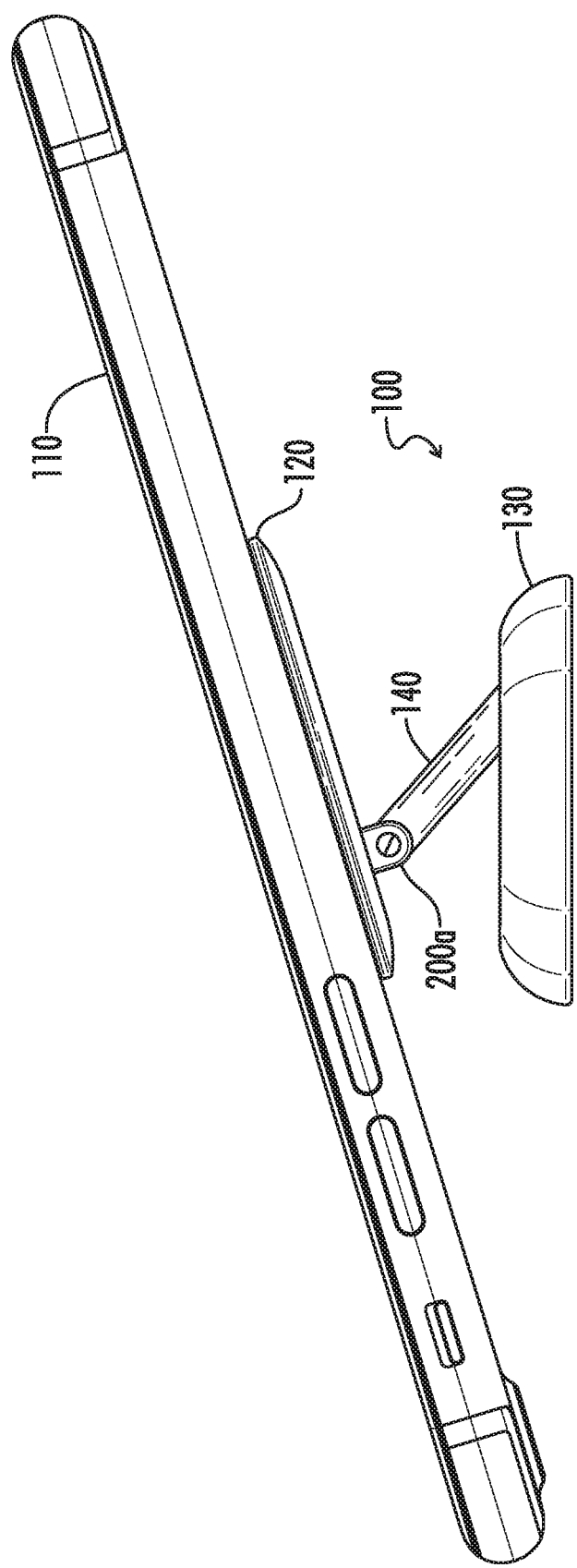
FIG. 10 is a side profile view of the accessory of FIG. 1 in the second configuration and fixed to the phone.

FIGS. 9 and 10 show the accessory 100 fixed to a mobile device 110. The accessory 100 is shown in the first configuration in FIG. 9, and in the second configuration in FIG. 10. As shown, when in the first configuration, the accessory 100 has a minimal thickness 150, and therefore would not prevent the mobile device 110 from being placed, for example, in a pocket. In the second configuration, the accessory 100 is expanded and may be used as a stand for the mobile device 110. Alternatively, it may be used as a mechanism for easily gripping the mobile device 110 where a user locates the support structure 140 between two fingers of his hand.

Figure 11A:
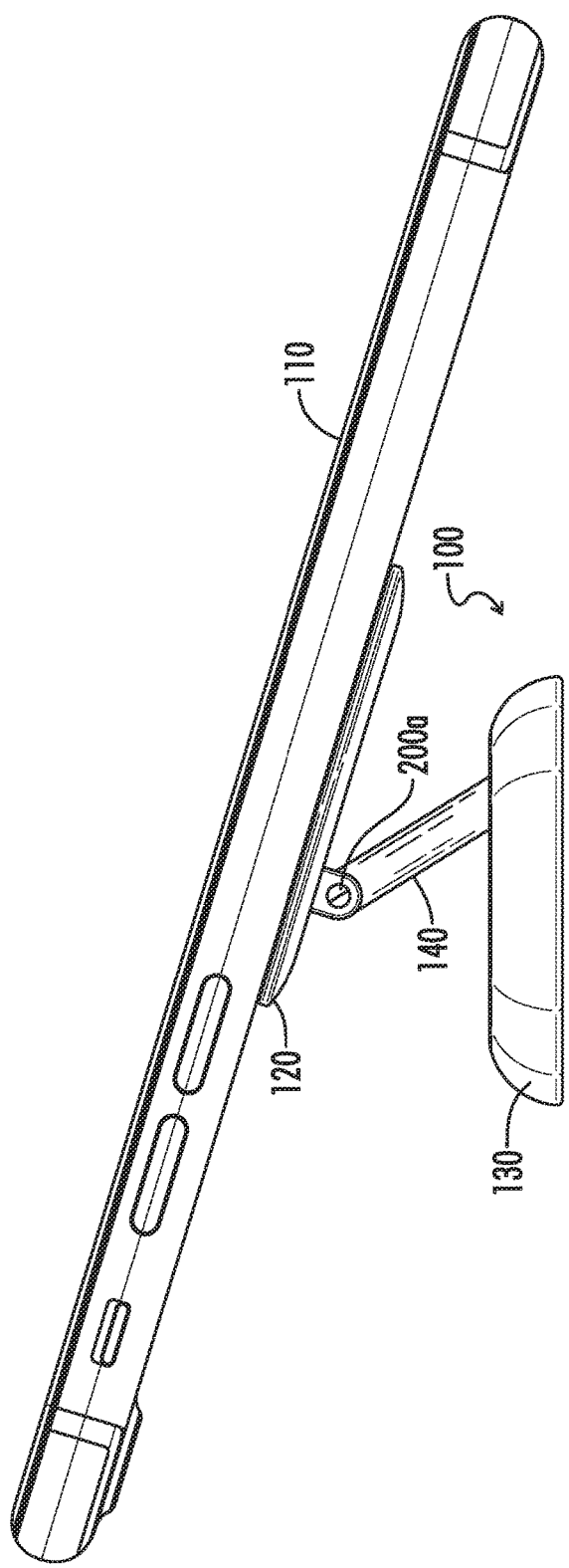
FIGS. 11A-B are side profile views of the accessory of FIG. 1 in additional configurations and fixed to the phone.
Figure 11B:
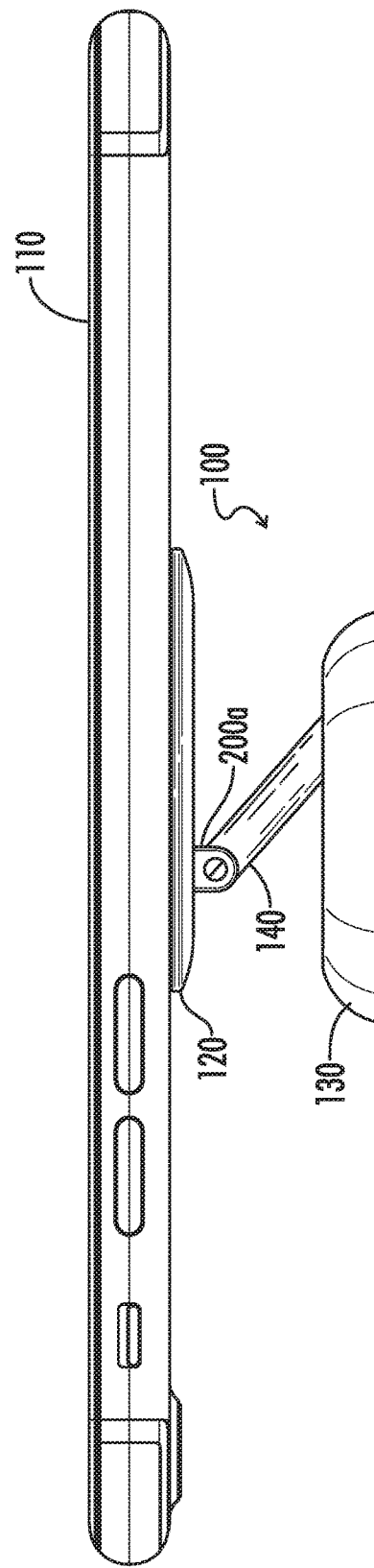

The hinges 200a, b may be provided with checks 220 for allowing the hinges and the support structure 140 to be fixed in specified positions when extended. Accordingly, when in the second configuration, the hinges 200a, b may be configured to retain a smartphone at a specified angle as shown in FIG. 10. Further, the accessory 100 may be provided with multiple checks 220 in the hinges 200a, b such that additional angles, such as those shown in FIGS. 11A and 11B are possible and may be stable. These may include, for example, distinct angles for using the accessory 100 as a mobile device stand and for using it as a gripping accessory.

While the figures show the accessory 100 placed on a table, it may also be mounted on a wall, as discussed above. Such a configuration may be provided with additional angles provided as stable orientations in order to support such wall mounting.

Figure 12:
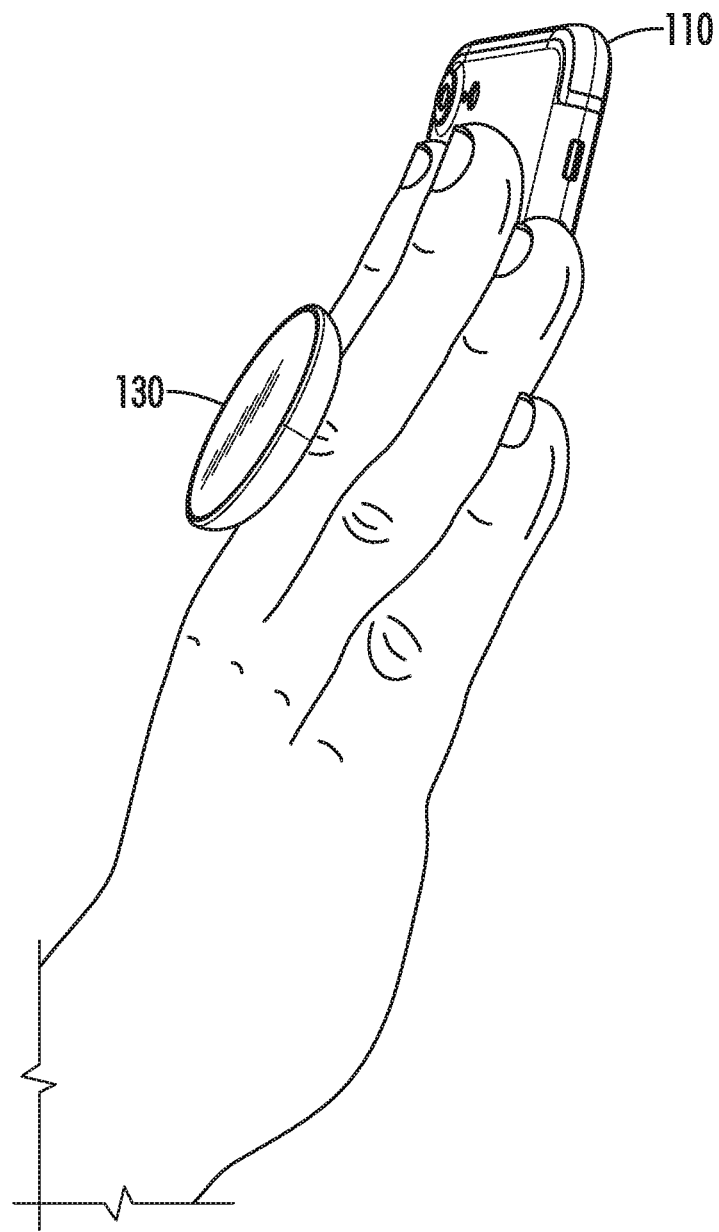
FIG. 12 shows a user holding a mobile device by gripping the accessory.

FIG. 12 shows a user holding a mobile device 110 by gripping the accessory 100 in its second configuration, with the support structure 140 between two fingers of his hand, and with the base element 130 behind the user's hand.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An accessory for a portable device or portable device case comprising:
    an engagement element for engaging a surface of a portable device;
    a base element movable relative to the engagement element; and
    a support structure linking the engagement element and the base element,
    wherein the accessory has a first configuration in which the engagement element is adjacent the base element and wherein a thickness of the accessory corresponds to a thickness of the engagement element combined with a thickness of the base element,
    the accessory has a second configuration in which the engagement element is spaced apart from the base element by the support structure,
    wherein the support structure is a linear element hinged relative to each of the engagement element and the base element,
    wherein one of the engagement element and the base element comprises a pocket for storing the support structure when in the first configuration,
    wherein the other of the engagement element and the base element has a substantially planar body and a hinge, the hinge connecting the corresponding element to the linear element,
    wherein the hinge has a hinge axis offset from the substantially planar body of the corresponding element,
    wherein the hinge is stored within the pocket when in the first configuration,
    wherein each of the engagement element and base element are substantially planar circular disks.

2. The accessory of claim 1, wherein the engagement element and the base element each have at least one substantially planar surface, and wherein the substantially planar surfaces face away from each other when in the first configuration.

3. The accessory of claim 1, wherein each of the engagement element and the base element have a substantially larger width than thickness.

4. The accessory of claim 1, wherein the hinges have checks for fixing the hinges in position when extended.

5. The accessory of claim 1, wherein the linear element is hinged at an eccentric location on the engagement element.

6. The accessory of claim 1, wherein the engagement element fixes the accessory to a portable device.

7. The accessory of claim 1, wherein the engagement element comprises a gripping surface.

8. The accessory of claim 1, wherein the base secures the accessory to a surface.

9. The accessory of claim 1, wherein the engagement element is a surface of a mobile device case.

10. The accessory of claim 1, wherein the thickness of the base element is greater than the thickness of the engagement element.

11. The accessory of claim 1, wherein the pocket is substantially linear and has a first width sized to correspond to a width of the linear element, and wherein the pocket has a section with a second width larger than the first width, the second width sized to correspond to a width of a hinge assembly at an end of the linear element.

12. An accessory for a portable device or portable device case comprising:
    an engagement element for engaging a surface of a portable device;
    a base element movable relative to the engagement element; and
    a support structure linking the engagement element and the base element,
    wherein the accessory has a first configuration in which the engagement element is adjacent the base element and wherein a thickness of the accessory corresponds to a thickness of the engagement element combined with a thickness of the base element,
    the accessory has a second configuration in which the engagement element is spaced apart from the base element by the support structure,
    wherein the support structure is a linear element hinged relative to each of the engagement element and the base element,
    wherein one of the engagement element and the base element comprises a pocket for storing the support structure when in the first configuration,
    wherein the other of the engagement element and the base element has a substantially planar body and a hinge, the hinge connecting the corresponding element to the linear element,
    wherein the hinge has a hinge axis offset from the substantially planar body of the corresponding element,
    wherein the hinge is stored within the pocket when in the first configuration, and
    wherein the pocket is substantially linear and has a first width sized to correspond to a width of the linear element, and wherein the pocket has a section with a second width larger than the first width, the second width sized to correspond to a width of a hinge assembly at an end of the linear element.

* * * * *